United States Patent [19]

Nakabayashi et al.

[11] Patent Number: 5,199,051

[45] Date of Patent: Mar. 30, 1993

[54] DATA LENGTH DETECTION DEVICE FOR DETECTING LENGTH OF FRAME DATA DEFINED BY FLAGS

[75] Inventors: Takeo Nakabayashi; Harufusa Kondoh, both of Hyogo, Japan

[73] Assignee: Mitsubishi Denki Kabushiki Kaisha, Tokyo, Japan

[21] Appl. No.: 765,767

[22] Filed: Sep. 26, 1991

[30] Foreign Application Priority Data

Nov. 1, 1990 [JP] Japan .................................. 2-296232

[51] Int. Cl.⁵ ............................................ H04L 25/38
[52] U.S. Cl. ...................... 375/117; 370/48; 375/94
[58] Field of Search ............... 375/114, 94, 116, 117; 370/48, 100, 102, 94.1, 95.1

[56] References Cited

U.S. PATENT DOCUMENTS

4,210,777  7/1980  Bowerman et al. ................. 375/117
4,748,643  5/1988  Setoguchi et al. ..................... 370/48
4,872,186 10/1989  Gerhart et al. ...................... 375/117

OTHER PUBLICATIONS

Seifart, "*Digitale Schaltungen und Schaltkreise*", Heidelberg (publisher) 1982, p. 182.
"Fernwirkeinrichtungen und Fernwirksysteme", Deutsche Elektrotechnische Kommission im DIN und VDE (DKE), Mar., 1988, pp. 18-25.

*Primary Examiner*—Stephen Chin
*Attorney, Agent, or Firm*—Lowe, Price, LeBlanc & Becker

[57] ABSTRACT

A data length detection device for detecting the byte length of received data in accordance with High Level Data Link Control Procedure is disclosed. When the byte length of an information field included in the received data, for example, is detected, initial data determined based on the byte length is generated from initial data generation circuit. A counting device, after being initialized by the initial data, starts counting operation in response to detection of a start flag. When a stop flat is detected, the counting device stops the counting operation, and the data counted at the time represents the byte length of the information field. Since an adder/subtracter is not necessary to detect the byte length, time required for the detection can be shortened.

8 Claims, 6 Drawing Sheets

HDLC FRAME FORMAT

← DIRECTION OF TRANSMISSION

F₁, F₂ : FLAG       (01111110)
AF     : ADDRESS FIELD
CF     : CONTROL FIELD
IF     : INFORMATION FIELD
FCS    : FCS FILD

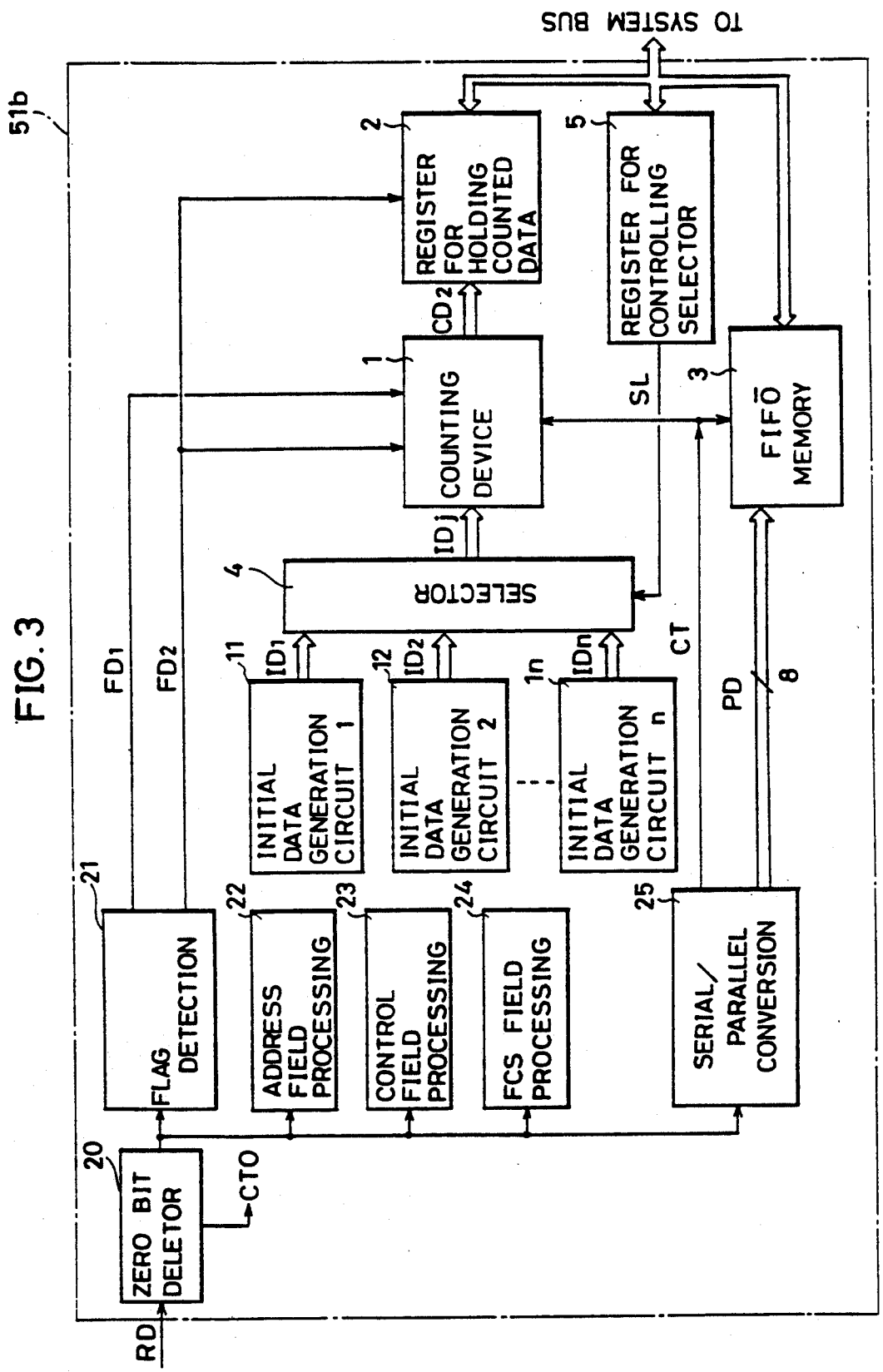

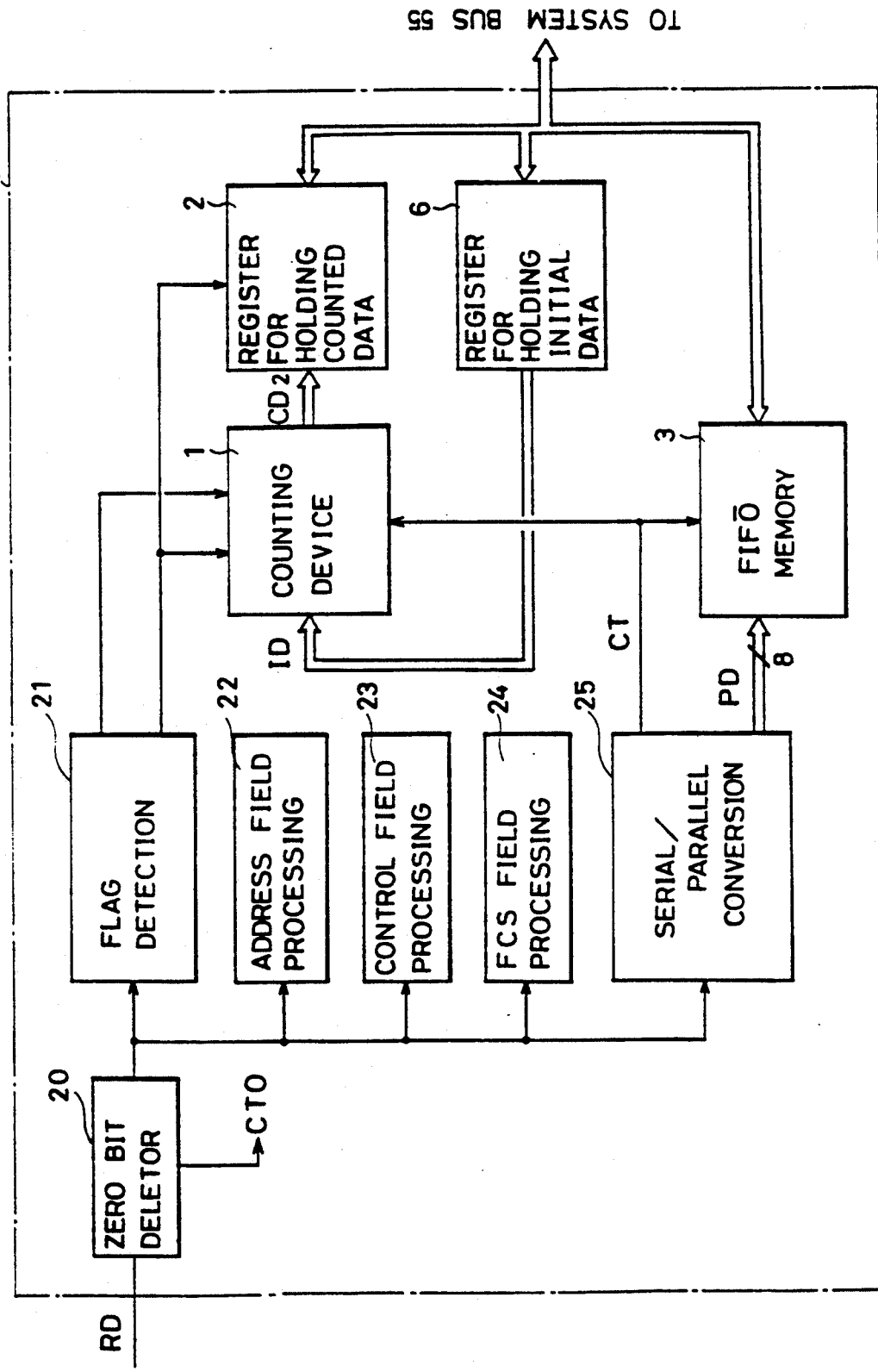

DATA LENGTH DETECTION DEVICE FOR DETECTING LENGTH OF FRAME DATA DEFINED BY FLAGS

BACKGROUND OF THE INVENTION

1. Field of the Invention

The present invention relates generally to data length detection devices, and in particular, to a data length detection device for detecting the data length of frame data defined by a start flag and a stop flag. The invention has particular applicability to receivers for receiving data in accordance with High Level Data Link Control Procedure (HDLC).

2. Description of the Background Art

High Level Data Link Control Procedure (referred to as "HDLC" hereinafter) is defined by International Organization for Standardization (ISO) as a protocol, and is widely used in various communication fields such as Integrated Service Digital Network (ISDN) and Digital Data Exchange (DDX). HDLC is used, for example, in Link Access Procedure (LAP, LAPB) in packet communication and LAPD for a D channel in ISDN. It is pointed out that the present invention, which will be described below, can be widely utilized in communication system generally in accordance with HDLC.

FIG. 5 is a frame format diagram of HDLC. In HDLC, all the data are transmitted for every frame. One frame is defined by a particular bit pattern "01111110" called a flag. Referring to FIG. 5, data to be transmitted is transmitted in a state interposed between a start flag F1 and a stop flag F2. One frame includes the start flag F1 (1 byte), an address field AF (1 or 2 bytes), a control field CF (1 or 2 bytes), an information field IF (arbitrary), a frame check sequence field FCS (2 bytes), and the stop flag F2 (1 byte). Data in the information field IF forms data to be originally transmitted, and the data length of the information field, i.e. the byte length can be changed, if necessary.

Generally, if data is transmitted in accordance with HDLC, transmission data satisfying the frame format shown in FIG. 5 is produced in a transmitting apparatus. The produced data is transmitted through a transmission path. The receiving apparatus receives the data transmitted and recognizes the data included in the information field.

FIG. 6 is a block diagram of a receiver in a communication terminal which performs communication control in accordance with the HDLC procedure (hereinafter referred to as HDLC communication terminal). Referring to FIG. 6, the HDLC communication terminal 50 includes a serial data receiver 51 for receiving serial communication data in accordance with HDLC through a transmission path 56, a memory 52 for storing data transmitted thereto, a DMAC part 53 for Direct Memory Access Control (referred to as "DMAC" hereinafter), and a microprocessor 54 for controlling processings in the receiver. A system bus 55 is connected between the serial data receiver 51, the memory 52, the DMAC 53 and the microprocessor 54, so that data transmission in the communication terminal 50 may be performed through the system bus 55.

The operation of the communication terminal shown in FIG. 6 will be described below. One example of the operation, in which data among the received data in the information field is written into the memory 52 will be described. When the serial receiver 51 receives data in accordance with HDLC, a start flag is detected in the serial data receiver 51. In response to the detection of the start flag, a reception start signal RS representing the start of data reception is generated, and the signal RS is applied to the DMAC 53. The DMAC 53 responds to the signal RS to apply to the microprocessor 54 a bus request signal BR for requesting use of the system bus 55. The microprocessor 54 responds to the signal BR, to apply to the DMAC 53 a bus acknowledgement signal BA for acknowledging the use of the system bus 55. Data ID in the information field included in the data received in the serial data receiver 51 is thus transmitted to the memory 52 through the system bus 55 in accordance with the control by the DMAC. The information field data ID is stored in the memory 52. When a stop flag is detected in the serial receiver 51, a reception stop signal RE representing completion of data reception is generated, and the signal RE is applied to the DMAC 53. At the same time, the serial data receiver 51 counts the byte number of the data IB in the information field, and then applies the byte number data IB to the microprocessor 54. The microprocessor 54 recognizes the byte number of the information field data and processes the information field data ID stored in the memory 52.

As can be seen from the above description, the received information field data ID is once stored in the memory 52 in accordance with the control by the DMAC 53, and then read out according to a request from the microprocessor 54.

Although only the data length of the information field in the serial data receiver 51 is detected in the foregoing, the detection of the byte length of data such as address field data or control field data and FCS field data is required, as the case may be. The serial data receiver 51 has such a circuit configuration that detection of the byte length of the data received can be performed in such a case.

One example of the serial data receiver 51 shown in FIG. 6 is shown in FIG. 7. The serial data receiver 51 shown in FIG. 7 represents the background art of the present invention. Referring to FIG. 7, the serial data receiver 51 includes a zero bit deletor 20 for deleting bit "0" inserted by a transmitter (not shown), a flag detector 21 for detecting a start flag and a stop flag, an address field processor 22 for performing a prescribed processing on address field data in received data RD, a control field processor 23 for performing a prescribed processing on control field data included in the received data RD, an FCS field processor 24 for performing a prescribed processing on FCS field data included in the received data RD, and a serial/parallel convertor 25 for converting serial received data RD into parallel data. The flag detector 21 generates a signal FD1 upon detecting a start flag F1 in the received data RD. The flag detector 21 additionally generates a detection signal FD2 upon detecting a stop flag F2 in the received data RD.

The serial data receiver 51 further includes a counter 1 driven by a count timing signal CT generated from the serial/parallel converter 25, a register 8 for holding offset data determined based on data to be counted, an adder/subtracter 7 for performing addition/subtraction of/from the offset data OD and count data CD1 held in the register 8, and a register 2 for holding the resultant data CD2 of the addition/subtraction. A First In First Out (referred to as "FIFO" hereinafter) memory 3 is connected to receive parallel data PD of 8 bit converted by the serial/parallel converter 25. The FIFO memory 3 responds to a count timing signal CT generated from the serial/parallel converter 25 to store the applied data PD.

As mentioned above, the data of the information field IF included in the received data RD has an arbitrary data length. In addition, as the case may be, the byte lengths of data in an address field AF and a control field CF are changed. Accordingly, it is necessary to detect the byte length of data included in the received data RD in the serial data receiver 51 shown in FIG. 7. The serial data receiver 51 shown in FIG. 7 operates as will be described below, in order to detect the byte length of the information field IF included in the received data RD.

After the zero bit deletor 20 deletes an unnecessary bit "0" from the received data RD, the output data is applied to the flag detector 21 and the serial/parallel converter 25. The zero bit deletor 20 further generates an internal operation timing signal CTO, and the signal CTO is supplied to other circuit portions in the serial data receiver 51. The serial/parallel converter 25 responds to the applied data to generate a count timing signal CT, and then applies the same to the counter 1. The flag detector 21 detects a start flag F1 included in the applied data, and applies a start flag detection signal FD1 to the counter 1. The counter 1 responds to the signal FD1, and is driven by the count timing signal CT. In other words, the counter 1 starts counting the byte length of the received data RD.

The adder/subtracter 7 receives the counted data CD1 and the offset data OD. The offset data OD held is set in the register 8 so that data CD2 generated from the adder/subtracter 7 represents only the byte length of the information field IF. In other words, the byte lengths of other fields except for the information field IF are previously known, and the offset data OD to be used on the subtraction of the byte lengths of these data is therefore applied to the adder/subtracter 7. Consequently, the data CD2 representing only the byte length of the information field IF is output from the adder/subtracter 7, and the data CD2 is applied to the register 2. The register 2 responds to a stop flag detection signal FD2 generated from the flag detector 21, and holds the data CD2. The data CD2 held in the register 2 is applied to the microprocessor 54 as the data IB shown in FIG. 6 through the system bus 55. As a result, the byte length of the information field IF in the received data RD is recognized in the microprocessor 54. The byte length of the information field IF may be changed for every frame of the received data RD, the above mentioned operation of detecting byte length is repeated for every frame of each of the received data RD.

In the serial data receiver 51 shown in FIG. 7, the adder/subtracter 7 is provided, and the adder/subtracter 7 should perform subtraction of the offset data OD kept in the register 8 from the data CD1 counted by the counter 1. A certain time period is required for performing the subtraction on these data CD1 and OD, which has been a hindrance to knowing the byte length of the information field in a shorter period of time. Especially, the operation of detecting the byte length is conducted repeatedly as described above, which increased the time delay caused by the adder/subtracter 7. In addition, it is pointed out that the serial data receiver 51 shown in FIG. 7 has a large circuit configuration, and, therefore, the control of which is complicated.

SUMMARY OF THE INVENTION

One object of the present invention is to shorten time required for detecting the data length of applied data in a data length detection device.

Another object of the present invention is to shorten time required for detecting the byte length of an information field in data in accordance with HDLC in a data length detection device.

A further object of the present invention is to shorten time required for detecting the data length of received data in a data receiver.

Still another object of the present invention is to shorten time required for detecting the byte length of an information field in received data in accordance with HDLC in a data receiver.

A data length detection device in accordance with the present invention includes a flag detection circuit for receiving one frame data defined by a start flag and a stop flag to detect the start flag and the stop flag. The frame data includes a first data part having a prescribed data length, and a second data part having an arbitrary data length. The data length detection device further includes an initial data generation circuit for generating initial data determined based on the prescribed data length of the first data part, and a counting circuit for counting the data length of the second data part in response to the flag detection circuit.

In operation, the counting circuit receives initial data generated from the initial data generation circuit, prior to its counting operation. The counting circuit responds to detection of the start flag by the flag detection circuit to start counting operation, and terminates the counting operation in response to detection of the stop flag. It is not necessary to perform any addition or subtraction on the output result of the counting circuit because the initial data required for accurate detection of the data length is prepared before the counting operation is initiated. The time required for the detection of the data length is therefore shortened, thereby facilitating the detection of the data length.

The data length detection device in accordance with the present invention, in one aspect, includes a flag detection circuit for receiving one frame data defined by a start flag and a stop flag and detecting the start flag and the stop flag. The frame data includes a first plurality of predetermined data fields each having a predetermined data length, and an arbitrary data field having an arbitrary data length. The data length detection circuit further includes initial data generation circuit for generating a second plurality of initial data determined based upon the data lengths of the first plurality of predetermined data fields, a counting circuit for counting the data length of the arbitrary data field in response to the flag detection circuit, and a selection circuit for selecting one of the second plurality of initial data output from the initial data generation circuit. The selection circuit applies the selected initial data to the counting circuit, prior to counting operation by the counting circuit. The counting circuit initiates the counting operation in response to the detection of the start flag by the flag detection circuit, and completes the counting operation in response to the detection of the stop flag.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram of a data receiver representing another embodiment of the present invention;

FIG. 4 is a block diagram of a data receiver representing a further embodiment of the present invention;

DESCRIPTION OF THE PREFERRED EMBODIMENTS

Figure 1:
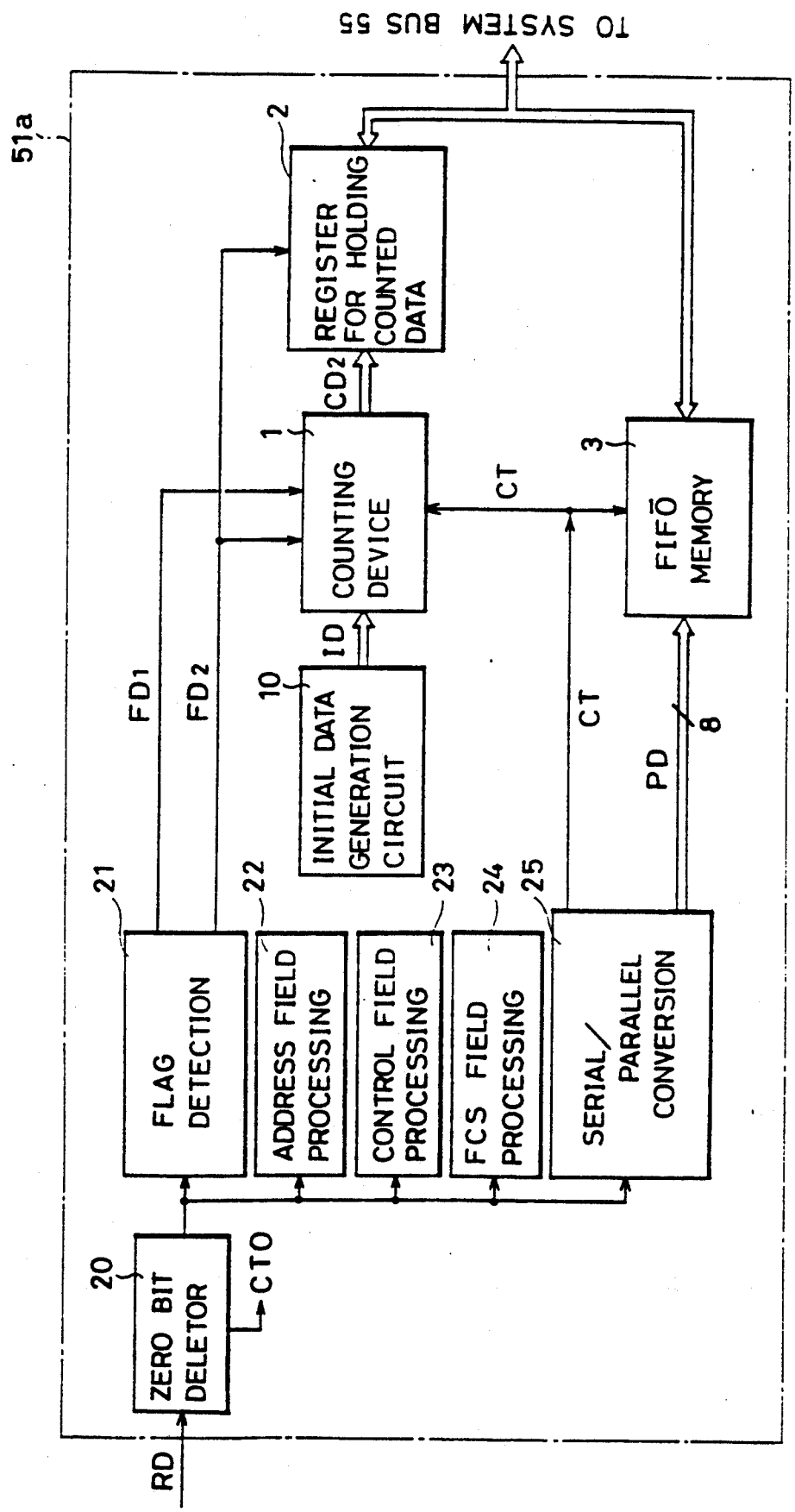
FIG. 1 is a block diagram of a data receiver representing one embodiment of the present invention.
Figure 7:
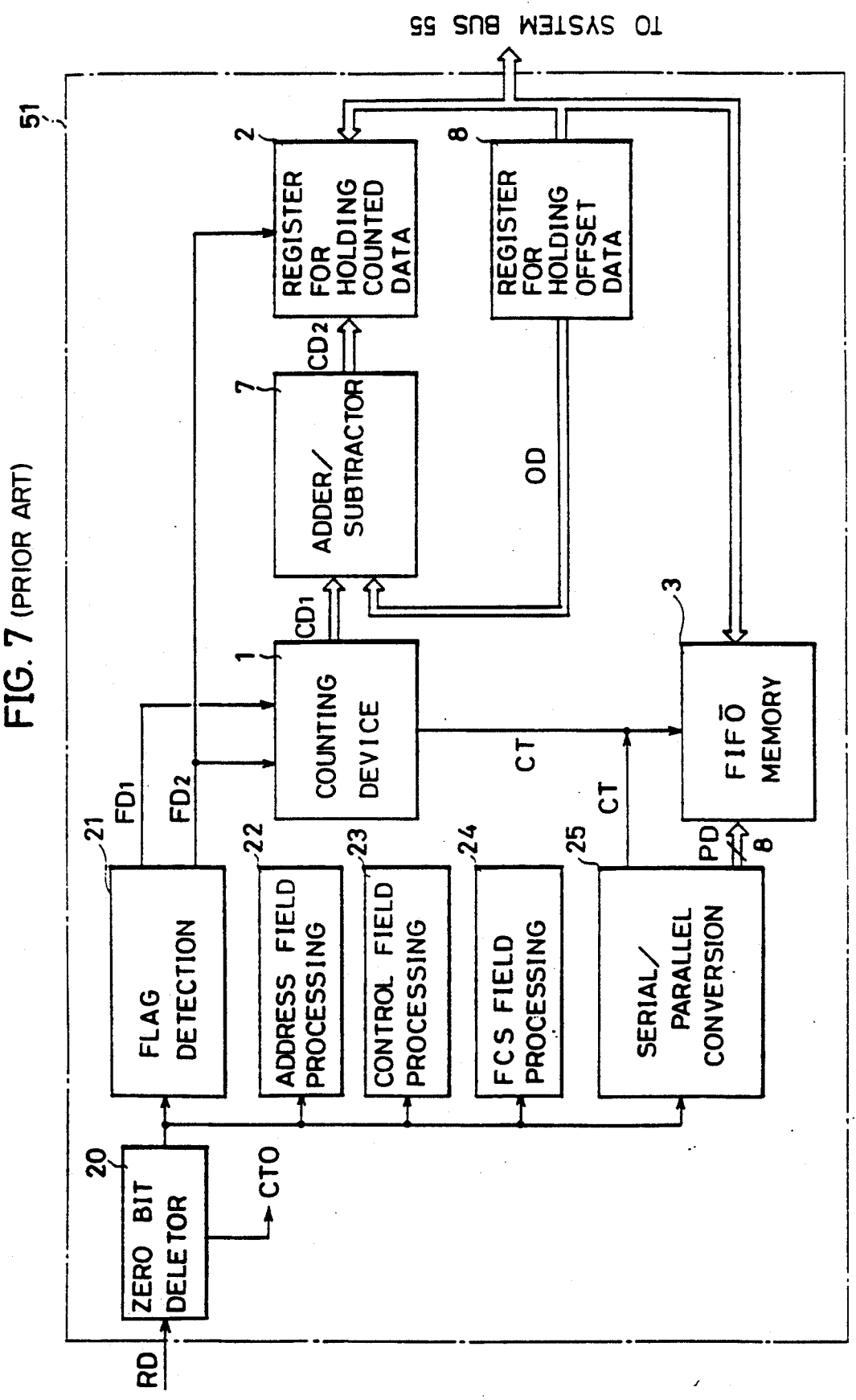
FIG. 7 is a block diagram of a data receiver showing the background of the present invention.

Referring to FIG. 1, a serial data receiver 51a is different as set forth in the following from a conventional one shown in FIG. 7. An initial data generation circuit 10 for generating predetermined initial data ID is connected to a counting device. The counting device 1 has its output directly connected to a register 2 for holding counted data. It should be noted that the adder/subtracter 7 shown in FIG. 7 in the register 8 for holding offset data is therefore omitted here.

Now, the operation will be described. In the following description, each byte length of an address field AF and a control field CF included in received data RD is of 1 byte, and the case in which the byte length of only the information field IF is detected will be described.

In order to detect the byte length of only the information field IF, the initial data generation circuit 10 generates data "−5" as an initial data, and applies the same to the counting device 1 prior to counting operation. The counting device 1 is thus initialized to the initial data "−5". A flag detector 21 generates a start flag detection signal FD1 upon detecting a start flag F1 in the received data RD. The counting device 1 responds to the signal FD1 and starts counting operation from the initial data "−5". That is, the counting device 1 receives a counting timing signal CT generated from a serial/parallel converter 25 and is driven by the signal CT. A stop flag detection signal FD2 is generated, when the flag detector 21 detects a stop flag F2. The counting device 1 responds to the signal FD2 and completes the counting operation. A counted data CD2 is thus generated, and the register 2 holds the data CD2 in response to the signal FD2. The data CD2 held in the register 2 is output through a system bus 55 in accordance with a request from a microprocessor 54. The data CD2 shows the byte length of only the information field IF included in the received data RD. It is not necessary therefore to perform addition/subtraction as in the case of the serial data receiver 51 shown in FIG. 7. Time required for detecting the byte length of the information field IF is thus shortened.

Figure 2:
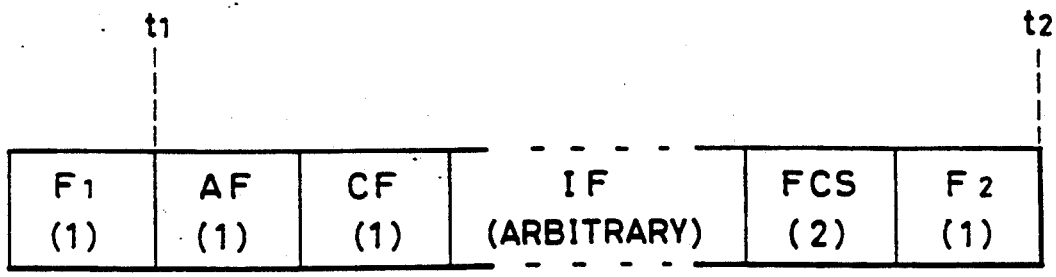
FIG. 2 is a frame format diagram of reception data for illustrating the operation of the data receiver shown in FIG. 1.
Figure 5:
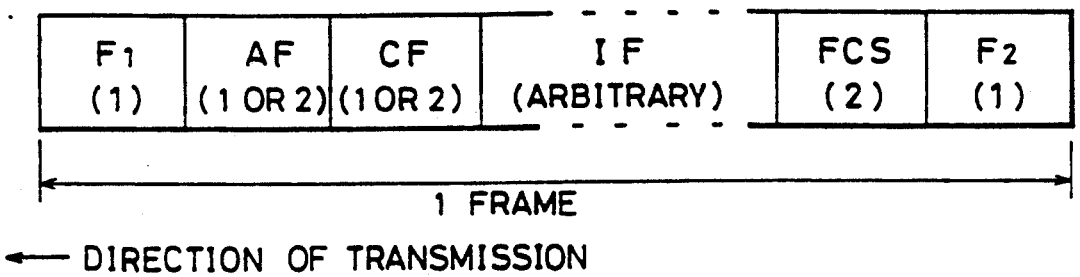
FIG. 5 is a frame format diagram of data in accordance with HDLC.
Figure 6:
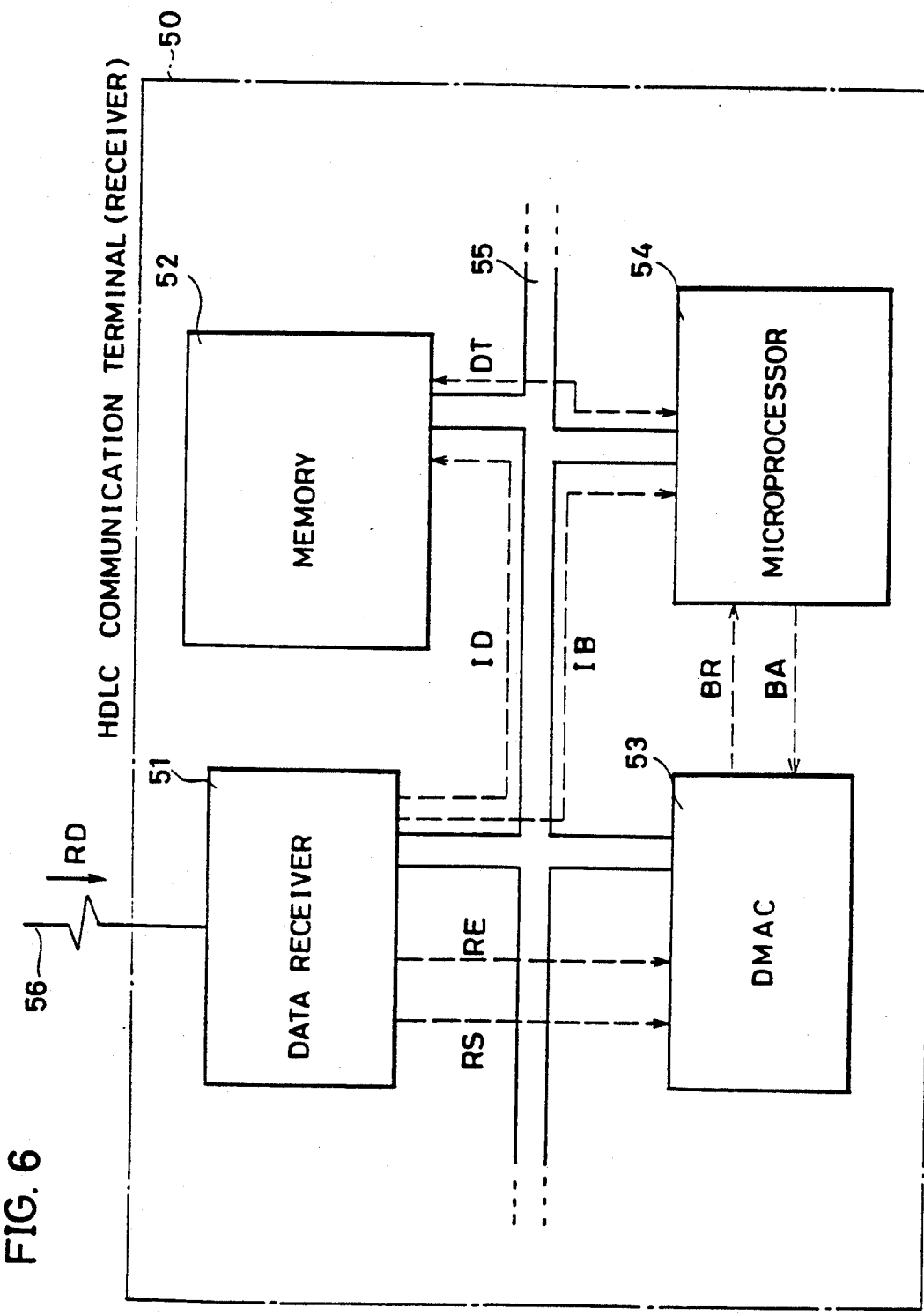
FIG. 6 is a block diagram of a receiver in an HDLC communication terminal.

It will be described why the value of the initial data ID is initialized to "−5" in order to detect the byte length of the information field IF. The received data RD, as mentioned above, has the frame format shown in FIG. 2. In other words, it is previously known that each of the address field AF and the control field CF has 1 byte. The counting device 1 shown in FIG. 1 starts counting operation in response to the detection of the start flag F1 (in time t1 in FIG. 2), and stops the counting operation in response to the detection of the stop flag F2 (in time t2). This shows that the counting device 1 is not able to detect the byte length of only the information field IF without initializing the initial data ID. The counting device 1 counts not only the byte length of the information field IF, but also of the address field AF (1 byte), the control field CF (1 byte), an FCS field FCS (2 bytes) and the stop flag F2 (1 byte). It is therefore necessary to subtract the byte lengths (5 bytes totally) of the address field AF, the control field CF, the FCS field FCS and the stop flag F2 from the counted data by the counting device 1. In the embodiment shown in FIG. 1, the subtraction is not conducted by the adder/subtracter but by applying the initial data ID to the counting device 1. In other words, the data "−5" is applied to the counting device 1 as the initial data ID.

It is assumed that the following data will be initialized as initial data ID, in order to detect the byte lengths of the data including other fields based on the above mentioned description.

$$ID2 = -4 \tag{1}$$

$$ID3 = -3 \tag{2}$$

$$ID4 = -1 \tag{3}$$

Equation (1) indicates that the initial data ID2 is initialized to data "−4" in order to detect the byte lengths of the control field CF and the information field IF. Equation (2) indicates that "−3" is initialized as the initial value ID3, in order to detect the byte lengths of the address field AF, the control field CF and the information field IF. Equation (3) indicates "−1" is initialized as the initial data ID4, in order to detect the byte lengths of the data including the FCS field FCS, the address field AF, the control field CF and the information field IF.

Referring to FIG. 3, another embodiment of the present invention will be described. As a serial data receiver 51b includes initial data generation circuits 11 to 1n each generating n pieces of initial data ID1 to IDn, and a selector 4 for selecting one of the initial data ID1 to IDn in response to a selection signal SL generated from the microprocessor 54. The above mentioned data "−5", "−4", "−3", "−1" etc. may be initialized as the initial data ID1 to IDn. A register 5 is provided to temporarily hold the selection signal SL generated from the microprocessor 54. The serial data receiver 51b responds to the selection signal SL and can selectively apply one of the initial data ID1 to IDn to the counting device. This means that the byte lengths of the data including not only the information field IF but also the other fields can be detected selectively.

A further embodiment of the present invention is shown in FIG. 4. A serial data receiver 51c is different from the serial data receiver 51a in including a register 6 for holding initial data in place of the initial data generation circuit 10. The register 6 receives initial data ID generated from the microprocessor 54 through a system bus 55, and holds the same. The held initial data ID is applied to the counting device 1 prior to counting operation by the counting device 1 in the same manner as in FIG. 1. It is therefore pointed out that in the serial data receiver 51c, the initial data ID can be easily changed in accordance with a request from the microprocessor 54. This shows that a field to be counted can be easily selected. The data CD2 counted by the counting device 1 represents the byte length of the requested field.

As mentioned above, since with any of the serial data receivers 51a, 51b and 51c shown in FIG. 1, FIG. 3 and FIG. 4, respectively, necessary initial data required for detecting an accurate byte length for every counting operation by the counting device 1 can be initialized in the counting device 1, no addition/subtraction is required after the counting operation is completed. The adder/subtracter 7 shown in FIG. 7 and the control conventionally required for controlling the same can be omitted, and, therefore, the time required for the operation of the adder/subtracter 7 is saved. In addition, in the serial data receivers 51b and 51c shown in FIG. 3 and FIG. 4, respectively, it is pointed out that a field, the byte length of which is to be detected, can be selected depending upon necessity.

Although the above mentioned embodiments have been described by illustrating the cases in which the byte lengths of the data in accordance with HDLC are detected, it should be noted that the present invention is generally applicable to a data length detection device for detecting the data length of one frame data defined by a start flag and a stop flag.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data length detection device for detecting the data length of one frame data defined by a start flag and a stop flag,
    said frame data including a first data part having a predetermined data length, and a second data part having an arbitrary data length,
    said device comprising:
    initial data generation means for generating initial data determined based on the predetermined data length of said first data part;
    flag detection means for receiving said frame data and detecting the start flag and the stop flag; and
    counting means responsive to said flag detection means for counting the data length of the second data part,
    said initial data generation means applying the initial data to said counting means prior to the counting operation of said counting means,
    said counting means starting the counting operation in response to the detection of the start flag and stopping the counting operation in response to the detection of the stop flag by said flag detection means.

2. The data length detection device in accordance with claim 1, wherein said frame data comprises HDLC frame data defined in accordance with High Level Data Link Control Procedure.

3. The data length detection device in accordance with claim 2, wherein said data length comprises a byte length.

4. The data length detection device in accordance with claim 2, wherein said HDLC frame data has said first and second data parts placed between said start flag and stop flag.

5. The data length detection device in accordance with claim 3, wherein said first data part comprises at least one of an address field, a control field and an FCS field, and
    said second data part comprises an information field.

6. The data length detection device in accordance with claim 1, wherein said initial data generation means comprises a microprocessor for generating said initial data, further comprising initial data holding means for holding the initial data generated from said microprocessor and applying the held data to said counting means.

7. The data length detection device in accordance with claim 1, further comprising a data receiver for receiving a reception signal including frame data defined by the start flag and the stop flag.

8. A data length detection device for detecting the data length of one frame data defined by a start flag and a stop flag, said frame data including a first plurality of data fields each having a predetermined data length, and an arbitrary data field having an arbitrary data length, comprising:
    initial data generation means for generating a second plurality of initial data determined based on the data length of said first plurality of predetermined data fields;
    flag detection means for receiving said frame data to detect the start flag and the stop flag;
    counting means responsive to said flag detection means for counting the data length of the arbitrary data field; and
    selection means responsive to an externally applied selection signal for selecting one of said second plurality of initial data output from said initial data generation means,
    said selection means applying the selected initial data to said counting means prior to the counting operation of said counting means,
    said counting means starting the counting operation in response to the detection of the start flag by said flag detection means and stopping the counting operation in response to the detection of the stop flag by said flag detection means.

* * * * *